United States Patent
Strandborg et al.

(10) Patent No.: US 12,260,506 B1
(45) Date of Patent: Mar. 25, 2025

(54) AUGMENTING REALITY USING MULTISCOPIC DISPLAY HAVING ADAPTIVE CROSSTALK COMPENSATION

(71) Applicant: Distance Technologies Oy, Helsinki (FI)

(72) Inventors: Mikko Strandborg, Hangonkylä (FI); Urho Konttori, Helsinki (FI)

(73) Assignee: Distance Technologies Oy, Helsinki (FI)

( * ) Notice: Subject to any disclaimer, the term of this patent is extended or adjusted under 35 U.S.C. 154(b) by 0 days.

(21) Appl. No.: 18/818,876

(22) Filed: Aug. 29, 2024

(51) Int. Cl.
*G06T 19/00* (2011.01)
*G06F 3/01* (2006.01)

(52) U.S. Cl.
CPC ............ *G06T 19/006* (2013.01); *G06F 3/013* (2013.01)

(58) Field of Classification Search
CPC .............................. G06T 19/006; G06F 3/013
See application file for complete search history.

(56) References Cited

U.S. PATENT DOCUMENTS

| 2021/0132693 | A1* | 5/2021 | Pulli | G02B 27/0093 |
| 2022/0075183 | A1* | 3/2022 | Lee | B60K 35/10 |

FOREIGN PATENT DOCUMENTS

KR 20220032448 A * 3/2022

\* cited by examiner

*Primary Examiner* — Jeffery A Brier
(74) *Attorney, Agent, or Firm* — Ziegler IP Law Group LLC

(57) ABSTRACT

For a given region of a given virtual image to be presented to a given eye of user(s), intensity values of pixels in a corresponding portion of a real-world image and an amount of crosstalk due to other virtual image(s) are determined. A minimum intensity level of pixels in the given region of the given virtual image are increased, based on the intensity values of the pixels in the corresponding portion of the real-world image. First intensity values of the pixels in the given region of the given virtual image are adjusted, based on the amount of crosstalk determined for the given region of the given virtual image. A light field image is generated by utilising the given virtual image and the other virtual image(s). The light field image is displayed via a light field display unit for producing a synthetic light field.

18 Claims, 2 Drawing Sheets

AUGMENTING REALITY USING MULTISCOPIC DISPLAY HAVING ADAPTIVE CROSSTALK COMPENSATION

TECHNICAL FIELD

The present disclosure relates to systems for augmenting reality using multiscopic displays having adaptive crosstalk compensation. The present disclosure also relates to methods for augmenting reality using multiscopic displays having adaptive crosstalk compensation.

BACKGROUND

In autostereoscopic and multiscopic displays, the phenomenon of crosstalk is a common problem. Crosstalk occurs when a virtual image intended for one eye leaks into a view of the other eye. It is generally well-known that the presence of high levels of crosstalk in an autostereoscopic display is detrimental. Crosstalk not only results in ghosting and a loss of contrast, but also causes a loss of a three-dimensional (3D) effect and depth resolution. All of these lead to user discomfort. It is noteworthy that the perception of crosstalk increases with increasing contrast and increasing binocular parallax of different virtual images (that are presented to different eyes of a given user).

A well-known conventional method for compensating for crosstalk in autostereoscopic displays includes:
(a) increasing a minimum intensity level (also referred to as lifting black levels) of a left virtual image and a right virtual image for a left eye and a right eye, respectively;
(b) determining an amount of crosstalk being induced (namely, how much of the left virtual image is visible to the right eye, and vice versa); and
(c) compensating for the crosstalk by adding to or subtracting from the intensity levels of the virtual images accordingly.

However, this conventional method is not suitable for augmented reality applications of autostereoscopic displays. This is because this conventional method does not take into account a scenario where a multiscopic synthetic light field is being optically combined with a real-world light field of a real-world environment. As a result, employing the conventional method for augmented reality applications results in a suboptimal image quality and a loss of 3D effect, which not only reduces an overall quality of the users' viewing experience, but also leads to visual discomfort.

Therefore, in light of the foregoing discussion, there exists a need to overcome the aforementioned drawbacks.

SUMMARY

The present disclosure seeks to provide a system and a method that is capable of compensating for crosstalk in an augmented reality implementation of a multiscopic display. The aim of the present disclosure is achieved by a system and a method for augmenting reality using a multiscopic display having adaptive crosstalk compensation, as defined in the appended independent claims to which reference is made to. Advantageous features are set out in the appended dependent claims.

Throughout the description and claims of this specification, the words "comprise", "include", "have", and "contain" and variations of these words, for example "comprising" and "comprises", mean "including but not limited to", and do not exclude other components, items, integers or steps not explicitly disclosed also to be present. Moreover, the singular encompasses the plural unless the context otherwise requires. In particular, where the indefinite article is used, the specification is to be understood as contemplating plurality as well as singularity, unless the context requires otherwise.

DETAILED DESCRIPTION OF EMBODIMENTS

Figure 1:
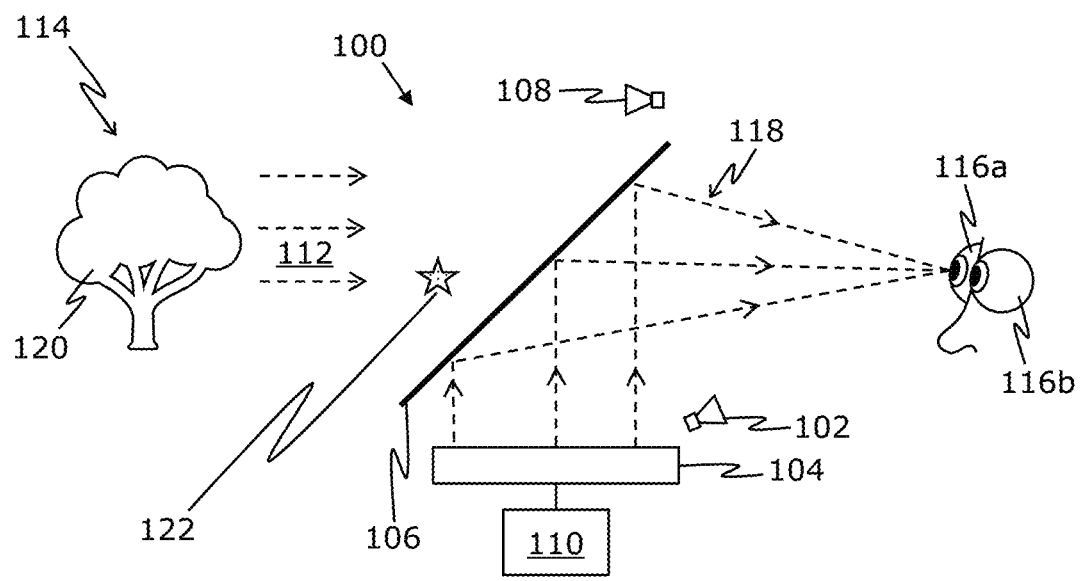
FIG. 1 is a schematic illustration of a system for augmenting reality using a multiscopic display having adaptive crosstalk compensation, in accordance with an embodiment of the present disclosure.

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect, an embodiment of the present disclosure provides a system comprising:
tracking means;
a light field display unit;
an optical combiner arranged on an optical path of the light field display unit and on an optical path of a real-world light field of a real-world environment;
at least one real-world-facing camera; and
at least one processor configured to:
determine a relative location of a first eye and of a second eye of at least one user with respect to the optical combiner, by utilising the tracking means;
obtain a first virtual image and a second virtual image to be presented to the first eye and the second eye of the at least one user, respectively, based on the relative location of the first eye and of the second eye of the at least one user with respect to the optical combiner;
capture at least one real-world image of the real-world environment via the at least one real-world-facing camera;
for a given region of the first virtual image, determine intensity values of pixels in a corresponding portion of the at least one real-world image;
for the given region of the first virtual image, determine an amount of crosstalk due to at least the second virtual image;
increase a minimum intensity level of pixels in the given region of the first virtual image, based on the intensity values of the pixels in the corresponding portion of the at least one real-world image;
adjust first intensity values of the pixels in the given region of the first virtual image, based on the amount of crosstalk determined for the given region of the first virtual image;
generate a light field image by utilising the first virtual image and the second virtual image; and display the light field image via the light field display unit for producing a synthetic light field, wherein the optical combiner is employed to reflect a first part and a second part of the synthetic light field towards the first eye and the second eye of the at least one user, presenting the first virtual image and the second virtual image to the first eye and the second eye, respectively, whilst optically combining the first part and the second part of the synthetic light field with the real-world light field.

In a second aspect, an embodiment of the present disclosure provides a method comprising:

determining a relative location of a first eye and of a second eye of at least one user with respect to an optical combiner, by utilising tracking means, wherein the optical combiner is arranged on an optical path of a light field display unit and on an optical path of a real-world light field of a real-world environment;

obtaining a first virtual image and a second virtual image to be presented to the first eye and the second eye of the at least one user, respectively, based on the relative location of the first eye and of the second eye of the at least one user with respect to the optical combiner;

capturing at least one real-world image of the real-world environment via at least one real-world-facing camera;

for a given region of the first virtual image, determining intensity values of pixels in a corresponding portion of the at least one real-world image;

for the given region of the first virtual image, determining an amount of crosstalk due to at least the second virtual image;

increasing a minimum intensity level of pixels in the given region of the first virtual image, based on the intensity values of the pixels in the corresponding portion of the at least one real-world image;

adjusting first intensity values of the pixels in the given region of the first virtual image, based on the amount of crosstalk determined for the given region of the first virtual image;

generating a light field image by utilising the first virtual image and the second virtual image; and displaying the light field image via the light field display unit for producing a synthetic light field, wherein the optical combiner is employed to reflect a first part and a second part of the synthetic light field towards the first eye and the second eye of the at least one user, presenting the first virtual image and the second virtual image to the first eye and the second eye, respectively, whilst optically combining the first part and the second part of the synthetic light field with the real-world light field.

The present disclosure provides the aforementioned system and the aforementioned method for augmenting reality using a multiscopic display (namely, comprising the light field display unit and the optical combiner) having adaptive crosstalk compensation. By increasing the minimum intensity level of pixels in the given region of the first virtual image, based on the intensity values of the pixels in the corresponding portion of the at least one real-world image, the system and the method adaptively take into account a scenario where the synthetic light field is being optically combined with the real-world light field of the real-world environment. This allows for presenting a high-quality and a high-contrast 3D visual scene that is free from ghosting artefacts and has a high depth resolution, even when the real-world light field is relatively bright. This improves an overall image quality, thereby improving an overall quality of the users' viewing experience, while preventing any visual discomfort. In case of a vehicle where the system is implemented as a heads-up display (HUD), the optical combiner may be integrated into a windshield of the vehicle. Moreover, the system is susceptible to be utilised for other use cases (for example, such as digital signage in retail stores, museums, and public spaces) as well. Furthermore, the system and the method are robust, fast, reliable, and support real-time simultaneous presentation of virtual images to eyes of one or more users.

In some implementations, the crosstalk compensation is performed in a similar manner for the second virtual image as well. Optionally, in this regard, the at least one processor is configured to:

for a given region of the second virtual image, determine intensity values of pixels in a corresponding portion of the at least one real-world image;

for the given region of the second virtual image, determine an amount of crosstalk due to at least the first virtual image;

increase a minimum intensity level of pixels in the given region of the second virtual image, based on the intensity values of the pixels in the corresponding portion of the at least one real-world image; and adjust second intensity values of the pixels in the given region of the second virtual image, based on the amount of crosstalk determined for the given region of the second virtual image.

A technical benefit of this is that the crosstalk compensation is performed most efficiently, thereby enhancing the overall quality of the users' viewing experience by two-fold. This results from a synergistic effect of performing the crosstalk compensation using the aforementioned system and the method for both the first virtual image and the second virtual image, which are presented simultaneously to the first eye and the second eye of the at least one user, respectively.

In other implementations, the crosstalk compensation can be performed in a different manner for the second virtual image. In such an implementation, the crosstalk may be compensated for the second virtual image in a conventional manner (namely, using a conventional technique). Optionally, in this regard, the at least one processor is configured to:

for a given region of the second virtual image, determine an amount of crosstalk due to at least the first virtual image;

increase a minimum intensity level of pixels in an entirety of the second virtual image (namely, without taking into account the intensity values of the pixels in the at least one real-world image); and adjust second intensity values of pixels in the given region of the second virtual image, based on the amount of crosstalk determined for the given region of the second virtual image.

As such a conventional technique does not take into account the scenario where the synthetic light field is being optically combined with the real-world light field, it does not lead to most efficient crosstalk compensation for the second virtual image. However, a combined effect of performing the crosstalk compensation using the aforementioned system and method on the first virtual image and performing the crosstalk compensation using the conventional technique on the second virtual image is still more efficient as compared to the prior art. A technical benefit of this is that computational needs of the system and the method are reduced, thereby improving a processing speed of the at least one processor.

Pursuant to embodiments of the present disclosure, the step of increasing the minimum intensity level of the pixels (hereinafter, interchangeably referred to as "black level lift", for the sake of convenience and clarity) is performed on a per-region basis. In other words, an amount by which the minimum intensity level of the pixels is increased (namely, the amount of the black level lift) can be different for different regions of a given virtual image (namely, the first virtual image and/or the second virtual image), as it is determined based on the intensity values of the pixels in corresponding portions of the at least one real-world image. This is unlike the prior art, where the black level lift is performed uniformly across an entirety of an image. It will be appreciated that a size of each of these regions of the given virtual image is much larger than just a single pixel. This allows the at least one user to have a point of comparison for the darkest colour in the given virtual image, namely for what "black" is in the given virtual image. Consequently, this allows to compensate for the crosstalk appropriately, such that ghosting artefacts are reduced and possibly minimised.

Moreover, optionally, the amount by which the minimum intensity level of the pixels is increased (namely, the amount of the black level lift) is varied across neighbouring regions of the given virtual image gradually. In other words, the amount of the black level lift is not varied drastically across the neighbouring regions. This facilitates a smooth transition in colours produced by the neighbouring regions of the given virtual image, thereby enhancing an overall image quality and visual perception. By "gradually" herein, it is meant that the amount of the black level lift is not changed by more than a predefined percent (of said amount) across the neighbouring regions. The predefined percent may, for example, lie in a range of 2 to 10 percent.

Additionally, optionally, the amount by which the minimum intensity level of the pixels is increased (namely, the amount of the black level lift) can be determined further based on whether an amount of crosstalk determined for a given region of the given virtual image is smaller than a predefined threshold amount. In other words, if the amount of crosstalk for the given region is almost negligible, the steps of increasing the minimum intensity level (namely, the black level lift) and adjusting the first intensity values of the pixels in the given region may be skipped completely or attenuated. In this regard, the predefined threshold amount depends on a dynamic range of colours in the given virtual image. As an example, for an 8 bit-representation (which allows for intensity values ranging from 0 to 255 units), the predefined threshold amount may lie in a range of 1 to 10 units.

Yet additionally, the amount by which the minimum intensity level of the pixels is increased (namely, the amount of the black level lift) can be determined further based on whether intensity values of pixels in a given region of the given virtual image is higher than an amount of crosstalk determined for the given region of the given virtual image. Thus, there may be at least one region of the given virtual image for which the step of increasing the minimum intensity level of the pixels can be skipped completely, or the minimum intensity level of the pixels can be increased by a smaller amount. Optionally, in this regard, the at least one processor is configured to determine, for the given region of the first virtual image, whether or not the step of increasing the minimum intensity level of the pixels of the given region (namely, the black level lift) is to be performed, based on whether the first intensity values of the pixels in the given region of the first virtual image is higher than the amount of crosstalk determined for the given region of the first virtual image. In this regard, if the first intensity values are not higher than the amount of crosstalk, then the step of increasing the minimum intensity level of the pixels of the given region can be performed. Otherwise, if the first intensity values are higher than the amount of crosstalk (for example, by a predefined margin), then the step of increasing the minimum intensity level of the pixels of the given region can be skipped or attenuated. This can be performed similarly for the second virtual image also.

Moreover, optionally, when increasing the minimum intensity level of the pixels in the given region of the first virtual image, the at least one processor is configured to:

detect when the given region of the first virtual image presents at least a part of at least one virtual object, and when the intensity values of the pixels in the corresponding portion of the at least one real-world image exceed respective sums of the first intensity values of the pixels in the given region of the first virtual image and a multiple of the amount by which the minimum intensity level is to be increased; and when it is detected that the given region of the first virtual image presents at least a part of at least one virtual object, and the intensity values of the pixels in the corresponding portion of the at least one real-world image exceed the respective sums of the first intensity values of the pixels in the given region of the first virtual image and the multiple of said amount, perform any one of:

selectively skip increasing the minimum intensity level of those pixels in the given region of the first virtual image that present at least the part of the at least one virtual object;

increase the minimum intensity level of those pixels in the given region of the first virtual image that present at least the part of the at least one virtual object by a given amount that is smaller than another amount by which the minimum intensity level of remaining pixels in the given region of the first virtual image is increased.

A technical benefit of this is that it allows for presenting even relatively dark virtual content on a highly-bright real-world background. This is made possible because the step of increasing the minimum intensity level of the pixels (namely, the black level lift) can be performed selectively. In essence, those pixels for which the step of increasing the minimum intensity level is skipped selectively (namely, the black level lift is not performed at all), or for which the minimum intensity level is increased by the given amount that is relatively smaller than the another amount (namely, the black level lift is attenuated and performed to a relatively smaller extent), would appear darker than the remaining pixels in the given region. In this regard, these pixels can be selected based on a shape and a size of at least the part of the at least one virtual object they present. This has been illustrated in conjunction with FIG. 2. These pixels may also be selected based on whether the at least one user is gazing at the part of the at least one virtual object. Such a selective manner of performing the step of increasing the minimum intensity level is particularly beneficial for a case where the part of the at least one virtual object is of interest to the at least one user.

Otherwise, when it is detected that the intensity values of the pixels in the corresponding portion of the at least one real-world image do not exceed the respective sums of the first intensity values of the pixels in the given region of the first virtual image and the multiple of said amount, the minimum intensity level of the pixels in the given region of the first virtual image may be increased uniformly in the given region of the first virtual image.

In some cases, the multiple of the amount by which the minimum intensity level is to be increased may be a positive integer multiple of said amount (for example, such as 1 times, 2 times, 3 times, or 5 times of said amount). In other cases, said multiple may be a positive non-integer multiple of said amount (for example, such as 1.8 times, 2.5 times, 3.75 times, or 4.8 times of said amount).

For illustration purposes only, there will now be considered an example where the intensity values of the first virtual image are expressed using an 8-bit representation, which allows for intensity values ranging between 0 and 255 units. In this example, there will now be considered the following:
  (a) said amount (by which the minimum intensity level is to be increased) is equal to 20 units;
  (b) the multiple of said amount is 5 times of said amount, that is, equal to 100 units;
  (c) the intensity values of the pixels in the corresponding portion of the at least one real-world image is 150 units;
  (d) the first intensity values of the pixels in the given region of the first virtual image lies in a range of 30 to 40 units.

In such a case, the respective sums of the first intensity values of the pixels in the given region of the first virtual image and the multiple of said amount would lie in a range of 130 to 140 units. Thus, the intensity values of the pixels in the corresponding portion of the at least one real-world image (which is 150 units) exceed the respective sums (which lie in the range of 130 to 140 units).

Now, if the black level lift is performed by said amount of 20 units and the crosstalk compensation reduces the first intensity values by 20 units, those pixels whose original first intensity values were 30 units would appear brighter as 180 units after the crosstalk compensation, due to the black level lift and the intensity of the real-world light field. Mathematically, this can be represented as follows:

$$O = I + B - C + R = 30 + 20 - 20 + 150 = 180 \text{ units},$$

Wherein
  "O" represents a final output intensity value of a given pixel, namely as it would appear to a user;
  "I" represents an original first intensity value of the given pixel;
  "B" represents the amount by which the minimum intensity level is increased;
  "C" represents crosstalk compensation for the given pixel; and
  "R" represents the intensity of the real-world light field corresponding to the given pixel.

However, if the black level lift is skipped completely for said pixels (that is, the step of increasing the minimum intensity level of these pixels is selectively skipped), these pixels would appear relatively less bright at 160 units (as compared to 180 units). As a result, these pixels would appear as being 20 units extra darker than the remaining pixels. This may be particularly beneficial when the at least one virtual object is to be presented as virtual text on a real-world object, for example, such as a bright real-world wall.

Pursuant to embodiments of the present disclosure, the crosstalk in the given region of the first virtual image arises due to at least the second virtual image (which is presented simultaneously with the first virtual image by the synthetic light field). By "at least", it is meant that the crosstalk in the given region of the first virtual image for a given user arises due to the second virtual image for the given user, but could also arise due to one or more pairs of first virtual images and second virtual images for one or more other users (namely, in a case where the at least one user comprises a plurality of users). In this regard, the amount of crosstalk can be determined by taking into account actual intensity values of the pixels in the second virtual image. The amount of crosstalk can be determined using any suitable well-known technique. As an example, the light field display unit and a multiscopic optical element (for example, such as a lenticular array, a parallax barrier, or similar) thereof can be pre-analysed (for example, during calibration) using specialised equipment to determine the amount of crosstalk. The specialised equipment could comprise at least one of: a high-resolution camera, a photometer, a spectroradiometer, a luminance meter, an electro-optical sensor. Additionally or alternatively, specialised software algorithms can be utilised to determine the amount of crosstalk based on characteristics of the light field display unit and the multiscopic optical element. Said characteristics comprise at least one of: a size of pixels of the light field display unit, a size of a pitch of the multiscopic optical element, a relative arrangement of the pixels with respect to transparent portions or lenticules in the multiscopic optical element. In case of a parallax barrier, the pitch is a distance between centres of two adjacent transparent portions in the parallax barrier. In case of a lenticular array, the pitch is a distance between centres of two adjacent lenticules in the lenticular array. The aforesaid specialised equipment and specialised software algorithms are well-known in the art.

For illustration purposes only, there will now be described a well-known technique for determining the amount of crosstalk for the first virtual image. This technique can be used similarly to determine the amount of crosstalk for the second virtual image. Light intensities visible to the first eye and to the second eye can be measured using any of the aforesaid specialised equipment. The specialised equipment can be positioned at a viewpoint of a given eye to allow for measuring the light intensities. Moreover, this technique will be described for a given user, namely for a given viewpoint of the first eye and the second eye of the given user. The technique can be extrapolated and utilised for multiple users in a similar manner.

Case 1: A white image is utilised as the first virtual image, while a black image is utilised as the second virtual image. First light intensities "F" are measured when the first virtual image and the second virtual image are presented. The first light intensities "F" correspond to a maximum possible intensity that can be presented to the first eye. The white image can be an image whose pixels are white or near white, wherein "near white" pixels have intensity values within a predefined percent from white pixels. Likewise, the black image can be an image whose pixels are black or near black, wherein "near black" pixels have intensity values within a predefined percent from black pixels. As an example, the predefined percent may lie in a range of 1 to 5 percent.

Case 2: A black image is utilised as the first virtual image, while a white image is utilised as the second virtual image. Second light intensities "S" are measured when the first virtual image and the second virtual image are presented. Theoretically, no light should go to the first eye. However, the second light intensities "S" correspond to some light that arises due to:

(a) light leakage (namely, crosstalk) from the second virtual image to the first eye; and (b) light from an imperfect black of the pixels of the first virtual image.

Case 3: Black images are utilised as the first virtual image and the second virtual image. Third light intensities "T" are measured when the first virtual image and the second virtual image are presented. The third light intensities "T" correspond to only the light from the imperfect black of the pixels of the first virtual image.

Now, the crosstalk can be calculated as follows:

$$\text{Crosstalk} = ((S-T)/(F-T)) \times 100$$

Herein, the numerator (S–T) gives the amount of the light leakage (namely, the crosstalk) from the second virtual image to the first eye, because the third light intensities "T" (corresponding to only the light from the imperfect black of the pixels of the first virtual image) are subtracted from the second light intensities "S". The denominator (F–T) gives an actual maximum intensity possible for the first eye, as the third light intensities "T" are subtracted from the first light intensities "F".

It will be appreciated that the crosstalk can be expressed in terms of a percentage, as described above. However, the amount of crosstalk can also be expressed in terms of units of the intensity values. This allows to take into account the amount of crosstalk when adjusting the first intensity values of the pixels in the given region of the first virtual image.

Furthermore, optionally, the first intensity values of the pixels in the given region of the first virtual image are adjusted separately for each sub-pixel (namely, for each colour component of the pixels). A technical benefit of adjusting the intensity values separately for each sub-pixel is that it allows for a granular control of the crosstalk compensation, thereby improving a colour reproduction of the 3D visual scene. Optionally, in this regard, the amount of crosstalk is determined at a sub-pixel level. In other words, the amount of crosstalk that is to be taken into account (when adjusting the first intensity values of the pixels) is also considered separately for each sub-pixel. As an example, if the amount of crosstalk determined for the given region of the first virtual image indicates a relatively greener colour (that may be arising due to at least the second virtual image), the first intensity values of the pixels in the given region of the first virtual image can be adjusted such that a relatively larger amount of crosstalk is subtracted from green sub-pixels as compared to other sub-pixels of said pixels in the given region of the first virtual image.

Additionally, optionally, when increasing the minimum intensity level of the pixels in the given region of the first virtual image, the black level lift is performed at a sub-pixel level. In this regard, the intensity values of the pixels in the corresponding portion of the at least one real-world image are considered at a sub-pixel level. As an example, if the intensity values of the pixels in the corresponding portion of the at least one real-world image pertain to a relatively greener colour, the black level lift can be performed in such a manner that a minimum intensity level of a green sub-pixel is increased by a relatively smaller amount as compared to the other sub-pixels of said pixels in the given region of the first virtual image. This is because the real-world light field adds to the synthetic light field of these pixels, and therefore, a relatively smaller amount of increase would be beneficial to show a near-original colour of said pixels.

Moreover, optionally, the at least one processor is configured to:

detect, for the given region of the first virtual image, when the intensity values of the pixels in the corresponding portion of the at least one real-world image exceed at least one of: (i) a predefined threshold intensity value, (ii) respective ones of the first intensity values of the pixels in the given region of the first virtual image, (iii) respective sums of the first intensity values and a multiple of an amount by which the minimum intensity level is to be increased; and when it is detected, for the given region of the first virtual image, that the intensity values of the pixels in the corresponding portion of the at least one real-world image exceed at least one of: (i) the predefined threshold intensity value, (ii) the respective ones of the first intensity values of the pixels in the given region of the first virtual image, (iii) the respective sums of the first intensity values and the multiple of said amount, perform at least one of:

skip determining the amount of crosstalk for the given region of the first virtual image;

skip increasing the minimum intensity level of the pixels in the given region of the first virtual image;

reduce an amount by which the minimum intensity level is increased in at least one of: the given region of the first virtual image, a surrounding region of the given region in the first virtual image;

skip adjusting the first intensity values of the pixels in the given region of the first virtual image, based on the amount of crosstalk determined for the given region of the first virtual image;

reduce the first intensity values of the pixels in the given region of the first virtual image.

Regarding the aforementioned first criterion (namely, pertaining to the aforesaid (i)), the predefined threshold intensity value may depend on the dynamic range of colours in the first virtual image. As an example, for an 8 bit-representation (which allows for intensity values ranging from 0 to 255 units), the predefined threshold intensity value may lie in a range of 127 to 255 units. In such an example, the intensity values of the pixels in the corresponding portion of the at least one real-world image correspond to relatively brighter intensities, which may likely obscure the given region of the first virtual image.

Regarding the aforementioned second criterion (namely, pertaining to the aforesaid (ii)), it may be sufficient for the intensity values of the pixels in the corresponding portion of the at least one real-world image to exceed the respective ones of the first intensity values of the pixels in the given region of the first virtual image. In such a case, when the second criterion is satisfied, it means that the real-world light field is brighter than the given region of the first virtual image, and may likely obscure the given region of the first virtual image.

Regarding the aforementioned third criterion (namely, pertaining to the aforesaid (iii)), the respective sums of the first intensity values and the multiple of the amount by which the minimum intensity level is to be increased can be implemented as explained earlier. As an example, the multiple of said amount may be taken as two times of said amount. Employing a multiple of said amount that is higher than said amount ensures that when the third criterion is satisfied, it means that the real-world light field is much brighter than the given region of the first virtual image, and is very likely to obscure the given region of the first virtual image.

Accordingly, when at least one of the aforesaid criteria (namely, pertaining to (i), (ii), (iii)) is satisfied, it may be beneficial to skip the crosstalk compensation to save computational resources, as the brightness of the real-world field would hide any possible crosstalk. Optionally, in such a case, at least one of: the step of determining the amount of crosstalk for the given region of the first virtual image, the step of increasing the minimum intensity level of the pixels in the given region of the first virtual image, the step of adjusting the first intensity values of the pixels in the given region of the first virtual image, may be skipped completely.

Alternatively, optionally, instead of skipping the crosstalk compensation completely, it may be beneficial to attenuate the crosstalk compensation. Accordingly, in this regard, the amount by which the minimum intensity level is increased can be reduced in the at least one of: the given region of the first virtual image, the surrounding region of the given region in the first virtual image. This results in an improved contrast, as explained earlier.

Moreover, if the real-world light field is detected to be relatively bright, it may not be necessary to display the given region of the first virtual image at full brightness (namely, its original intensity value), as it would be hidden by the real-world brightness. Optionally, in this regard, the first intensity values of the pixels in the given region of the first virtual image are reduced. This allows to reduce power consumption of the light field display unit. Notably, such reduction of the first intensity values is different from adjusting of the first intensity values for the crosstalk compensation.

Otherwise, when it is detected, for the given region of the first virtual image, that the intensity values of the pixels in the corresponding portion of the at least one real-world image do not exceed any one of: (i) the predefined threshold intensity value, (ii) the respective ones of the first intensity values, (iii) the respective sums, the crosstalk compensation can be performed as explained earlier. In such a case, the crosstalk compensation may not be required to be skipped or attenuated.

Furthermore, optionally, the at least one user comprises a plurality of users, wherein the at least one processor is configured to:
  detect when intensity values of pixels in a given region of a given virtual image for a given eye of a given user are higher than intensity values of pixels in a corresponding portion of the at least one real-world image, and when the intensity values of the pixels in the given region of the given virtual image are lower than intensity values of pixels in another portion of the at least one real-world image that corresponds to a region of another virtual image for a given eye of another user, wherein light corresponding to the given region of the given virtual image and light corresponding to said region of the another virtual image reflect off a same portion of the optical combiner towards the given eye of the given user and the given eye of the another user, respectively; and
  when it is detected that the intensity values of the pixels in the given region of the given virtual image for the given eye of the given user are higher than the intensity values of the pixels in the corresponding portion of the at least one real-world image, and when the intensity values of the pixels in the given region of the given virtual image are lower than the intensity values of the pixels in the another portion of the at least one real-world image that corresponds to said region of the another virtual image for the given eye of the another user, perform at least one of:
    skip determining an amount of crosstalk for the given region of the given virtual image;
    skip increasing a minimum intensity level of the pixels in the given region of the given virtual image;
    reduce an amount by which the minimum intensity level is increased in at least one of: the given region of the given virtual image, a surrounding region of the given region in the given virtual image;
    skip adjusting the intensity values of the pixels in the given region of the given virtual image, based on the amount of crosstalk determined for the given region of the given virtual image.

This pertains to a case where a current viewpoint of the given eye of the given user is not receiving a relatively bright real-world light field, but is being presented a relatively brighter synthetic light field (namely, pertaining to the intensity values of the pixels in the given region of the given virtual image), and where this relatively brighter synthetic light field could potentially lead to crosstalk for another viewpoint of the given eye of the another user, but this another viewpoint is receiving relatively higher real-world brightness. As a result, the another viewpoint of the given eye of the another user would not be able to perceive any crosstalk due to the given region of the given virtual image for the given user, as it would be obscured by the relatively higher real-world brightness anyway.

Thus, in such a case, the given region of the given virtual image can be presented at "original" high brightness, without compensating for the crosstalk. In other words, at least one of: the step of determining the amount of crosstalk for the given region of the given virtual image, the step of increasing the minimum intensity level of the pixels in the given region of the given virtual image, the step of adjusting the intensity values of the pixels in the given region of the given virtual image, may be skipped completely. This allows for saving computational resources.

Alternatively, optionally, instead of skipping the crosstalk compensation completely, it may be beneficial to attenuate the crosstalk compensation. Accordingly, in this regard, the amount by which the minimum intensity level is increased can be reduced in the at least one of: the given region of the given virtual image, the surrounding region of the given region in the given virtual image. This results in an improved contrast, as explained earlier.

Otherwise, when it is detected that the intensity values of the pixels in the given region of the given virtual image for the given eye of the given user are not higher than the intensity values of the pixels in the corresponding portion of the at least one real-world image, and/or the intensity values of the pixels in the given region of the given virtual image are not lower than the intensity values of the pixels in the another portion of the at least one real-world image that corresponds to said region of the another virtual image for the given eye of the another user, the crosstalk compensation can be performed as explained earlier. In such a case, the crosstalk compensation may not be required to be skipped or attenuated.

Moreover, optionally, the system further comprises gaze-tracking means, wherein the at least one processor is configured to:
  determine gaze directions of the first eye and the second eye of the at least one user, by utilising the gaze-tracking means;
  determine a focus depth at which the at least one user is gazing, based on the gaze directions of the first eye and the second eye;

detect when a difference between the focus depth and an optical depth at which at least one virtual object is being presented via the synthetic light field is greater than a predefined threshold difference; and when it is detected that said difference is greater than the predefined threshold difference, perform at least one of:
  skip determining the amount of crosstalk for the given region of the first virtual image;
  skip or attenuate increasing the minimum intensity level of the pixels in the given region of the first virtual image;
  skip or attenuate adjusting the first intensity values of the pixels in the given region of the first virtual image, based on the amount of crosstalk determined for the given region of the first virtual image.

The tracking means can be implemented as the gaze-tracking means. In this regard, the at least one processor is configured to utilise tracking data collected by the tracking means, for determining the gaze directions of the first eye and the second eye of the at least one user. Optionally, when the tracking data comprises a plurality of images of a given eye of a given user, the at least one processor is configured to: extract a plurality of features of the given eye from a given image; and determine based on the plurality of features at least one of: a position of a pupil of the given eye with respect to corners of the given eye, a curvature of an eyelid of the given eye, a position of an eyelash of the given eye, a shape of the given eye, a size of the given eye. Such gaze-tracking is well-known in the art.

The focus depth at which the at least one user is gazing can be determined based on an interpupillary distance between the eyes of the at least one user (namely, the first eye and the second eye of the given user) and a convergence of the gaze directions. The focus depth may, for example, be determined using a triangulation technique. Moreover, advanced algorithms based on machine learning models can be utilised to improve an accuracy of focus depth determination by accounting for various factors, for example, such as a position and an orientation of the head of the at least one user, eye characteristics (for example, such as a shape and/or a size of the eyes) specific to the at least one user, and previous calibration data collected for the at least one user. The interpupillary distance can be pre-determined by an optometrist. Alternatively or additionally, the interpupillary distance can also be pre-determined using any suitable well-known gaze tracking technique.

The optical depth at which the at least one virtual object is being presented is known, because it correlates with a disparity between the first virtual image and the second virtual image presented to the first eye and the second eye of the at least one user. This optical depth is determined along at least one of the gaze directions. Moreover, in case of multiple virtual objects, the at least one virtual object comprises a virtual object (or its part) that lies in a gaze region of a field of view of the at least one user. In this regard, the gaze region is determined based on the gaze directions of the at least one user.

When the difference between the focus depth and said optical depth is detected to be greater than the predefined threshold difference, it means that the at least one user is not gazing at the at least one virtual object being presented to the at least one user via the synthetic light field. In this regard, the predefine threshold difference can be expressed in terms of a predefined percent of any one of: the focus depth, the optical depth at which the at least one virtual object is being presented. As an example, the predefined percent could lie in a range of 10 percent to 20 percent. Moreover, the predefined threshold difference can be selected depending on a depth of field at the focus depth. Similar to the depth of field (namely, related to focus steps) in a camera, the human eye also focuses sharply in a given depth of field at a given focus depth. As an example, for near-focus, the predefined threshold difference may lie in a range of 10 cm to 30 cm. As another example, for far-focus, the predefined threshold difference may lie in a range of 0.5 metre to 2 metres.

Thus, when it is detected that the at least one user is not gazing at the at least one virtual object, it may be beneficial to skip or attenuate the crosstalk compensation. Optionally, at least one of: the step of determining the amount of crosstalk, the step of increasing the minimum intensity level, the step of adjusting the first intensity values of the pixels, may be skipped completely. This allows for saving computational resources.

Alternatively, optionally, instead of skipping the crosstalk compensation completely, it may be beneficial to attenuate the crosstalk compensation. Accordingly, in this regard, at least one of: the step of increasing the minimum intensity level of the pixels, the step of adjusting the first intensity values of the pixels, may be attenuated. When the step of increasing the minimum intensity level of the pixels is attenuated, it means that the amount by which the minimum intensity level is increased can be reduced in the at least one of: the given region of the first virtual image, the surrounding region of the given region in the first virtual image. This results in an improved contrast, as explained earlier. When the step of adjusting the first intensity values of the pixels is attenuated, it means that an amount by which the first intensity values of the pixels are to be adjusted can be reduced.

Otherwise, when it is detected that said difference is not greater than the predefined threshold difference, the crosstalk compensation can be performed as explained earlier. In such a case, the crosstalk compensation may not be required to be skipped or attenuated.

Furthermore, optionally, the system further comprising the gaze-tracking means, wherein the at least one processor is configured to:
  determine the gaze direction of the first eye of the at least one user, by utilising the gaze-tracking means;
  detect, based on the gaze direction of the first eye, when the at least one user is not gazing at the given region of the first virtual image; and
  when it is detected that the at least one user is not gazing at the given region of the first virtual image, perform at least one of:
    skip determining the amount of crosstalk for the given region of the first virtual image;
    skip or attenuate increasing the minimum intensity level of the pixels in the given region of the first virtual image;
    skip or attenuate adjusting the first intensity values of the pixels in the given region of the first virtual image, based on the amount of crosstalk determined for the given region of the first virtual image.

In this regard, when it is determined that the gaze direction of the first eye is not intersecting with a portion of the optical combiner wherefrom light corresponding to the given region of the first virtual image is reflecting towards the first eye of the at least one user, it is detected that the at least one user is not gazing at the given region of the first virtual image. As a result, this given region of the first virtual image is considered as a non-focus region of the at least one user, where it may not be necessary to perform the crosstalk compensation.

Thus, when it is detected that the at least one user is not gazing at the given region of the first virtual image, it may be beneficial to skip or attenuate the crosstalk compensation. Optionally, at least one of: the step of determining the amount of crosstalk, the step of increasing the minimum intensity level, the step of adjusting the first intensity values of the pixels, may be skipped completely. This allows for saving computational resources.

Alternatively, optionally, instead of skipping the crosstalk compensation completely, it may be beneficial to attenuate the crosstalk compensation. Accordingly, in this regard, at least one of: the step of increasing the minimum intensity level of the pixels, the step of adjusting the first intensity values of the pixels, may be attenuated. This results in an improved contrast, as explained earlier.

Otherwise, when it is detected that the at least one user is gazing at the given region of the first virtual image, the crosstalk compensation can be performed as explained earlier. In such a case, the crosstalk compensation may not be required to be skipped or attenuated.

Moreover, optionally, the system further comprises the gaze-tracking means and at least one real-world-facing depth camera, wherein the at least one processor is configured to:
  determine gaze directions of the first eye and the second eye of the at least one user, by utilising the gaze-tracking means;
  determine a focus depth at which the at least one user is gazing, based on the gaze directions of the first eye and the second eye;
  capture a depth image of the real-world environment, by utilising the at least one real-world-facing depth camera;
  determine an optical depth at which a real-world object is present, based on the depth image and the gaze directions of the first eye and the second eye;
  detect when a first difference between the focus depth and an optical depth at which at least one virtual object is being presented via the synthetic light field is smaller than a first predefined threshold difference, and when a second difference between the focus depth and the optical depth at which the real-world object is present is greater than a second predefined threshold difference; and
  when it is detected that the first difference is smaller than the first predefined threshold difference and the second difference is greater than the second predefined threshold difference, apply a defocus blur on the at least one real-world image of the real-world environment, prior to determining the intensity values of the pixels in the corresponding portion of the at least one real-world image.

The optical depth at which the real-world object is present is determined along at least one of the gaze directions. This optical depth can be determined based on an intersection of the at least one of the gaze directions with the depth image. In this regard, the depth image is reprojected from a perspective of the at least one real-world-facing depth camera to a perspective of at least one of the eyes of the at least one user (to which the at least one of the gaze directions pertains). Examples of the at least one real-world-facing depth camera include, but are not limited to, a Time-of-Flight (ToF) camera, a light detection and ranging (LiDAR) camera, a Red-Green-Blue-Depth (RGB-D) camera, a laser rangefinder, a stereo camera, a plenoptic camera, a ranging camera, a Sound Navigation and Ranging (SONAR) camera. Moreover, in case of multiple virtual objects, the at least one virtual object comprises a virtual object (or its part) that lies in the gaze region of the field of view of the at least one user.

When the first difference between the focus depth and the optical depth at which the at least one virtual object is being presented is smaller than the first predefined threshold difference, it means that the at least one user is gazing at the at least one virtual object. When the second difference between the focus depth and the optical depth at which the real-world object is present is greater than the second predefined threshold difference, it means that the at least one user is not gazing at the real-world object. Optionally, the second predefined threshold difference is selected as a higher value as compared to the first predefined threshold difference. This takes care of a scenario where the at least one virtual object is displayed at a significantly different optical depth (vergence-wise) as compared to the real-world object. As an example, the first predefined threshold difference may lie in a range of 0.25 metre to 2 metres, while the second predefined threshold difference may lie in a range of 2 metres to 10 metres.

A technical benefit of applying the defocus blur on the at least one real-world image of the real-world environment upon such a detection is that it allows for compensating for a difference in the optical depth between the at least one virtual object and the real-world object, thereby allowing for optimising the crosstalk compensation for cases where the at least one user is gazing at the optical depth of the at least one virtual object. This is because in such a case, the real-world object is out-of-focus for the at least one user.

Otherwise, when it is detected that the first difference is not smaller than the first predefined threshold difference, and/or the second difference is not greater than the second predefined threshold difference, the defocus blur may not be applied on the at least one real-world image of the real-world environment.

Notably, when combining the synthetic light field with the real-world light field using the optical combiner, if the at least one virtual object is presented at an optical depth (namely, a vergence distance) that is closer to the optical depth at which the real-world object is present, both eyes see the at least one virtual object overlaid with the same real-world object (or the same part thereof). As an example, a virtual advertisement (namely, the at least one virtual object) may be presented to look like as if it was painted on an outer wall of a building (namely, the real-world object). However, if the at least one virtual content is much closer to the at least one user than the real-world object, the at least one user would see different regions of the real-world object (or even different real-world objects) overlaid with the at least one virtual object due to binocular parallax. Both these situations can be leveraged in crosstalk compensation, as described above.

Furthermore, in a case where the optical depth at which the at least one virtual object is being presented is similar to a native optical depth of the light field display unit, the defocus blur may be applied without a need to check for any criteria. This is because the real-world object is typically at a relatively larger optical depth, as compared to the native optical depth. Herein, the native optical depth of the light field display unit is equal to a sum of a distance between a given eye of a given user and the optical combiner and a distance between the optical combiner and a light-emitting component of the light field display unit. By "similar" hereinabove, it is meant that said optical depth is within, for example, 10 centimetre of the native optical depth. In a typical implementation inside a vehicle, the native optical depth may lie in a range of 100 cm to 300 cm.

The aforesaid defocus blurring of the at least one real-world image can be applied using any suitable well-known technique. Such defocus blurring can be referred to as a simulated defocus blur, and involves smoothing out details in a given image. Such blurring can be achieved by using various convolution techniques, for example, such as a box blur, a Gaussian blur, a median blur, or similar. The box blur involves a simple averaging of the intensity values of pixels within a given kernel size. The Gaussian blur involves use of a kernel that is based on a Gaussian function to provide a weighted average, wherein pixels located at a central part of a given kernel size have a higher weightage. The median blur involves replacing an intensity value of a given pixel with a median value of its neighbouring pixels within a given kernel size. All these techniques are well-known in the art.

The at least one processor controls an overall operation of the system. The at least one processor is communicably coupled to the tracking means, the light field display unit and the at least one real-world-facing camera. Optionally, the at least one processor is implemented as a processor of the light field display unit. Alternatively, optionally, the at least one processor is implemented as a processor of a computing device that is communicably coupled to the light field display unit. Examples of the computing device include, but are not limited to, a laptop, a desktop, a tablet, a phablet, a personal digital assistant, a workstation, and a console. Yet alternatively, optionally, the at least one processor is implemented as a cloud server (namely, a remote server) that provides a cloud computing service.

Throughout the present disclosure, the term "tracking means" refers to a specialised equipment for detecting and/or tracking a location of a first eye and a second eye of a given user. Optionally, the tracking means is implemented as at least one tracking camera. The at least one tracking camera may comprise at least one of: at least one visible-light camera, at least one infrared (IR) camera, at least one depth camera. Examples of such a visible-light camera include, but are not limited to, a Red-Green-Blue (RGB) camera, a Red-Green-Blue-Alpha (RGB-A) camera, a Red-Green-Blue-Depth (RGB-D) camera, a Red-Green-Blue-White (RGBW) camera, a Red-Yellow-Yellow-Blue (RYYB) camera, a Red-Green-Green-Blue (RGGB) camera, a Red-Clear-Clear-Blue (RCCB) camera, a Red-Green-Blue-Infrared (RGB-IR) camera, and a monochrome camera. Examples of such a depth camera include, but are not limited to, a ToF camera, a LiDAR camera, an RGB-D camera, a laser rangefinder, a stereo camera, a plenoptic camera, a ranging camera, a SONAR camera. It will be appreciated that any combination of various different types of cameras (namely, the at least one visible-light camera, the at least one IR camera, the at least one depth camera) may be utilised in the tracking means. When different types of images captured by the various different types of tracking cameras are utilised, the location of the user's eyes can be determined highly accurately, as results obtained from one type of image can be used to refine results obtained from another type of image. Herein, these different types of images constitute the tracking data collected by the tracking means, and may be in the form of at least one of: visible-light images, IR images, depth images. It will be appreciated that the tracking means tracks both eyes of the at least one user with a significantly high accuracy and precision, such that an error in determining the relative location may, for example, be minimised to within a tolerance range of approximately (+/−) 8 millimetres.

It will be appreciated that the at least one tracking camera is arranged to face the at least one user, to facilitate tracking of the location of the user's eyes. A relative location of the at least one tracking camera with respect to the optical combiner is pre-known. This enables to determine the relative location of the first eye and of the second eye of the at least one user with respect to the optical combiner. Optionally, in this regard, when the tracking means are utilised to detect and/or track the location of the first eye and of the second eye, a location of the first eye and of the second eye with respect to the at least one tracking camera is accurately known. Thus, the relative location of the first eye and of the second eye with respect to the optical combiner can be determined, based on the relative location of the at least one tracking camera with respect to the optical combiner and the location of the first eye and of the second eye with respect to the at least one tracking camera.

Pursuant to embodiments of the present disclosure, different types of light field display units can be implemented. For example, the light field display unit can be any one of: a hogel-based light field display unit, a lenticular array based light field display unit, a parallax-barrier based light field display unit. The light field display unit could be implemented as a display with or without a backlight. Examples of the display include, but are not limited to, a Liquid Crystal Display (LCD), a Light-Emitting Diode (LED)-based display, a micro LED-based display, an Organic LED (OLED)-based display, a micro OLED-based display, an Active Matrix OLED (AMOLED)-based display, and a Liquid Crystal on Silicon (LCoS)-based display. The light field display unit comprises a multiscopic optical element. Depending on the type of the light field display unit, the multiscopic optical element can be a lenticular array, a parallax barrier, or similar. In this regard, the at least one processor is configured to control the multiscopic optical element, based on the relative location of the first eye and of the second eye with respect to the optical combiner, to direct light produced by a first set of pixels of the light field image towards the first eye, whilst directing light produced by a second set of pixels of the light field image towards the second eye.

As mentioned earlier, the light field image is generated by utilising the first virtual image and the second virtual image, which are obtained based on the relative location of the first eye and of the second eye of the at least one user with respect to the optical combiner. In a case where the at least one user comprises a plurality of users, there would be a corresponding pair of a first virtual image and a second virtual image for each of the plurality of users. The light field image may be understood to be a two-dimensional (2D) image comprising a plurality of pixels, wherein a first set of pixels from amongst the plurality of pixels is responsible for generating the first part of the synthetic light field that corresponds to the first eye, and a second set of pixels from amongst the plurality of pixels is responsible for generating the second part of the synthetic light field that corresponds to the second eye. It will be appreciated that the pixels belonging to the first set are not arranged in a continuous manner across the light field image; similarly, the pixels belonging to the second set are also not arranged in a continuous manner across the light field image. Optionally, the pixels belonging to the first set and the pixels belonging to the second set are arranged in alternating vertical stripes across a horizontal field of view of the light field image, wherein each vertical stripe comprises one or more scanlines of pixels. This is because humans perceive depth mainly based on horizontal binocular parallax. Thus, in this way, the light field image would be considerably different as compared to a conventional 2D image that is displayed via conventional 2D displays, because the same light field image comprises visual information corresponding to the first eye as well as the second eye of the at least one user.

In some implementations, the at least one virtual object is a part of a virtual environment. Optionally, in such implementations, the at least one processor is configured to generate the first virtual image and the second virtual image from a perspective of the relative location of the first eye and the second eye of the at least one user with respect to the optical combiner, by employing a three-dimensional (3D) model of the virtual environment. The term "virtual object" refers to a computer-generated object (namely, a digital object). Examples of the at least one virtual object may include, but are not limited to, a virtual navigation tool, a virtual gadget, a virtual message, a virtual entity, a virtual entertainment media, a virtual vehicle or part thereof, and a virtual information. The term "three-dimensional model" of the virtual environment refers to a data structure that comprises comprehensive information pertaining to the at least one virtual object. Such a comprehensive information is indicative of at least one of: a plurality of features of the at least one virtual object or its portions, a shape and a size of the at least one virtual object or its portions, a pose of the at least one virtual object or its portions, a material of the at least one virtual object or its portions, a colour and an optical depth of the at least one virtual object or its portions. The 3D model may be generated in the form of a 3D polygonal mesh, a 3D point cloud, a 3D surface cloud, a voxel-based model, or similar. Optionally, the at least one processor is configured to store the 3D model at a data repository that is communicably coupled to the at least one processor. The data repository may be implemented as a memory of the at least one processor, a cloud-based database, or similar. In other implementations, the at least one processor is configured to generate the first virtual image and the second virtual image to be presented to the first eye and the second eye of the at least one user in a form of 2D user interface (UI) elements. The 2D UI elements could pertain to, for example, a virtual navigation tool, a virtual gadget, a virtual message, a virtual entity, a virtual entertainment media, a virtual information, or similar.

Furthermore, optionally, when generating the light field image, the at least one processor is configured to determine, within the light field image, a position of a given pixel of the first set and a position of a given pixel of the second set that correspond to a given synthetic three-dimensional (3D) point, based on the interpupillary distance between the eyes of the at least one user and an optical depth at which the given synthetic 3D point is to be displayed. This allows for presenting the given synthetic 3D point at said optical depth, by utilising binocular disparity.

Optionally, the at least one processor is configured to determine a colour of the given pixel of the first set and a colour of the given pixel of the second set, by employing the 3D model of the virtual environment. Optionally, a colour of a given pixel is represented by a colour value. Such a colour value could, for example, be an RGB value, an RGB-A value, a CMYK value, a YUV value, an RGB-D value, an RYYB value, an RGGB value, an RGB-IR value, or similar. Optionally, the at least one processor is configured to employ at least one neural network for determining the colour of the given pixel. Optionally, the at least one neural network is implemented as a Neural Radiance Field (NeRF) model. The NeRF model is well-known in the art.

Throughout the present disclosure, the term "synthetic light field" refers to a light field that is produced (namely, generated) synthetically by the light field display unit, while the term "real-world light field" refers to a light field emanating from the real-world environment in which the at least one user is present. It will be appreciated that in case of the real-world light field, light from, for example, a natural light source (such as the Sun) and/or an artificial light source (such as a lamp, a bulb, a tube-light, or similar), are reflected off real-world objects (or their portions) to be incident towards the eyes of the at least one user. In this way, visual information (for example, such as colour information, optical depth information, and the like) pertaining to said real-world objects is typically perceived by the first eye and the second eye. On the other hand, in case of the synthetic light field, light emanating from the light field display unit, upon reflecting off the optical combiner, is incident on the first eye and the second eye of the at least one user. In this way, visual information pertaining to the at least one virtual object can be perceived by the first eye and the second eye.

Throughout the present disclosure, the term "optical combiner" refers to a specialised equipment that is capable of reflecting a corresponding part of the synthetic light field towards a given eye of the at least one user, whilst optically combining said part of the synthetic light field with the real-world light field. Optionally, the optical combiner is implemented by way of at least one of: a lens, a mirror, a semi-transparent mirror, a semi-transparent film, a semi-transparent flexible membrane, a prism, a beam splitter, an optical waveguide, a polarizer. Optical combiners are well-known in the art. Optionally, a tilt angle of the optical combiner with respect to an image plane of the light field display unit lies in a range of 10 degrees and 75 degrees.

Moreover, the at least one real-world-facing camera is arranged to face the real-world environment. As an example, in a case where the system is implemented in a vehicle, the at least one real-world-facing camera can be mounted on an exterior body of the vehicle, such that the optical combiner does not lie in an optical path of the at least one real-world-facing camera. The at least one real-world-facing camera comprises at least one visible-light camera and optionally, at least one depth camera. Examples of the at least one visible-light camera include, but are not limited to, an RGB camera, an RGB-A camera, an RGB-D camera, an RGBW camera, an RYYB camera, an RGGB camera, an RCCB camera, an RGB-IR camera, and a monochrome camera. Examples of the at least one depth camera include, but are not limited to, a ToF camera, a LiDAR camera, an RGB-D camera, a laser rangefinder, a stereo camera, a plenoptic camera, a ranging camera, a SONAR camera.

The at least one real-world-facing camera is employed to capture the at least one real-world image of the real-world environment. Optionally, the at least one real-world image is reprojected from a perspective of the at least one real-world-facing camera to the perspective of a given eye (namely, the first eye or the second eye), based on a pose of the at least one real-world-facing camera and the relative position of the given eye with respect to the optical combiner. Such reprojection can be performed by utilising at least one depth image of the real-world environment captured by the at least one depth camera. The reprojection can be performed prior to determining the corresponding portion of the at least one real-world image. By "corresponding portion of the at least one real-world image", it means that the corresponding portion of the at least one real-world image has a same field of view as the given region of the given virtual image, from the perspective of the given eye of the at least one user.

Optionally, the intensity values of the pixels in the corresponding portion of the at least one real-world image are adjusted, based on a decrease in a transmission of a corresponding part of the real-world light field upon passing through the optical combiner. This depends on a specific transparency level of the optical combiner, which is pre-known.

Moreover, in some implementations, an active optical device could be employed to intentionally decrease the transmission of the real-world light field passing through the optical combiner towards the eyes of the at least one user. As an example, the active optical device can be implemented as a liquid-crystal-based optical device, or an electrochromic optical device. The active optical device can be implemented in a form of any one of: (i) a layer on a real-world-facing side of the optical combiner, (ii) a separate device arranged between the optical combiner and the real-world environment. The active optical device may be employed to improve contrast in the 3D visual scene being presented to the at least one user. In such implementations, the intensity values of the pixels in the corresponding portion of the at least one real-world image can be further adjusted by determining an amount by which the transmission of the real-world light field is decreased by the active optical device. As the active optical device can be controlled actively to adjust the transmission, said amount by which the transmission of the real-world light field is decreased can be determined accordingly. It will be appreciated that the active optical device may be activated to decrease the transmission in only certain regions of the optical combiner, instead of an entirety of the optical combiner. Thus, the intensity values of the pixels in the corresponding portion of the at least one real-world image can be adjusted on per-region basis.

The present disclosure also relates to the method as described above. Various embodiments and variants disclosed above, with respect to the aforementioned first aspect, apply mutatis mutandis to the method.

In some implementations, the method further comprises:
for a given region of the second virtual image, determining intensity values of pixels in a corresponding portion of the at least one real-world image;
for the given region of the second virtual image, determining an amount of crosstalk due to at least the first virtual image;
increasing a minimum intensity level of pixels in the given region of the second virtual image, based on the intensity values of the pixels in the corresponding portion of the at least one real-world image; and
adjusting second intensity values of the pixels in the given region of the second virtual image, based on the amount of crosstalk determined for the given region of the second virtual image.

Moreover, optionally, the method further comprises:
detecting, for the given region of the first virtual image, when the intensity values of the pixels in the corresponding portion of the at least one real-world image exceed at least one of: a predefined threshold intensity value, respective ones of the first intensity values of the pixels in the given region of the first virtual image, respective sums of the first intensity values and a multiple of an amount by which the minimum intensity level is to be increased; and
when it is detected, for the given region of the first virtual image, that the intensity values of the pixels in the corresponding portion of the at least one real-world image exceed at least one of: the predefined threshold intensity value, the respective ones of the first intensity values of the pixels in the given region of the first virtual image, the respective sums of the first intensity values and the multiple of said amount, performing at least one of:
skipping the step of determining the amount of crosstalk for the given region of the first virtual image;
skipping the step of increasing the minimum intensity level of the pixels in the given region of the first virtual image;
reducing an amount by which the minimum intensity level is increased in at least one of: the given region of the first virtual image, a surrounding region of the given region in the first virtual image;
skipping the step of adjusting the first intensity values of the pixels in the given region of the first virtual image, based on the amount of crosstalk determined for the given region of the first virtual image;
reducing the first intensity values of the pixels in the given region of the first virtual image.

Furthermore, optionally, the at least one user comprises a plurality of users, wherein the method further comprises:
detecting when intensity values of pixels in a given region of a given virtual image for a given eye of a given user are higher than intensity values of pixels in a corresponding portion of the at least one real-world image, and when the intensity values of the pixels in the given region of the given virtual image are lower than intensity values of pixels in another portion of the at least one real-world image that corresponds to a region of another virtual image for a given eye of another user, wherein light corresponding to the given region of the given virtual image and light corresponding to said region of the another virtual image reflect off a same portion of the optical combiner towards the given eye of the given user and the given eye of the another user, respectively; and
when it is detected that the intensity values of the pixels in the given region of the given virtual image for the given eye of the given user are higher than the intensity values of the pixels in the corresponding portion of the at least one real-world image, and when the intensity values of the pixels in the given region of the given virtual image are lower than the intensity values of the pixels in the another portion of the at least one real-world image that corresponds to said region of the another virtual image for the given eye of the another user, performing at least one of:
skipping the step of determining an amount of crosstalk for the given region of the given virtual image;
skipping the step of increasing a minimum intensity level of the pixels in the given region of the given virtual image;
reducing an amount by which the minimum intensity level is increased in at least one of: the given region of the given virtual image, a surrounding region of the given region in the given virtual image;
skipping the step of adjusting the intensity values of the pixels in the given region of the given virtual image, based on the amount of crosstalk determined for the given region of the given virtual image.

Moreover, optionally, the first intensity values of the pixels in the given region of the first virtual image are adjusted separately for each sub-pixel.

Furthermore, optionally, the method further comprises:
determining gaze directions of the first eye and the second eye of the at least one user, by utilising gaze-tracking means;

determining a focus depth at which the at least one user is gazing, based on the gaze directions of the first eye and the second eye;

detecting when a difference between the focus depth and an optical depth at which at least one virtual object is being presented via the synthetic light field is greater than a predefined threshold difference; and when it is detected that said difference is greater than the predefined threshold difference, performing at least one of:

skipping the step of determining the amount of crosstalk for the given region of the first virtual image;

skipping or attenuating the step of increasing the minimum intensity level of the pixels in the given region of the first virtual image;

skipping or attenuating the step of adjusting the first intensity values of the pixels in the given region of the first virtual image, based on the amount of crosstalk determined for the given region of the first virtual image.

Moreover, optionally, the method further comprises:

determining a gaze direction of the first eye of the at least one user, by utilising gaze-tracking means;

detecting, based on the gaze direction of the first eye, when the at least one user is not gazing at the given region of the first virtual image; and when it is detected that the at least one user is not gazing at the given region of the first virtual image, performing at least one of:

skipping the step of determining the amount of crosstalk for the given region of the first virtual image;

skipping or attenuating the step of increasing the minimum intensity level of the pixels in the given region of the first virtual image;

skipping or attenuating the step of adjusting the first intensity values of the pixels in the given region of the first virtual image, based on the amount of crosstalk determined for the given region of the first virtual image.

Furthermore, optionally, the method further comprises:

determining gaze directions of the first eye and the second eye of the at least one user, by utilising gaze-tracking means;

determining a focus depth at which the at least one user is gazing, based on the gaze directions of the first eye and the second eye;

capturing a depth image of the real-world environment, by utilising at least one real-world-facing depth camera;

determining an optical depth at which a real-world object is present, based on the depth image and the gaze directions of the first eye and the second eye;

detecting when a first difference between the focus depth and an optical depth at which at least one virtual object is being presented via the synthetic light field is smaller than a first predefined threshold difference, and when a second difference between the focus depth and the optical depth at which the real-world object is present is greater than a second predefined threshold difference; and when it is detected that the first difference is smaller than the first predefined threshold difference and the second difference is greater than the second predefined threshold difference, applying a defocus blur on the at least one real-world image of the real-world environment, prior to determining the intensity values of the pixels in the corresponding portion of the at least one real-world image.

Moreover, optionally, the step of increasing the minimum intensity level of the pixels in the given region of the first virtual image comprises:

detecting when the given region of the first virtual image presents at least a part of at least one virtual object, and when the intensity values of the pixels in the corresponding portion of the at least one real-world image exceed respective sums of the first intensity values of the pixels in the given region of the first virtual image and a multiple of an amount by which the minimum intensity level is to be increased; and when it is detected that the given region of the first virtual image presents at least a part of at least one virtual object, and the intensity values of the pixels in the corresponding portion of the at least one real-world image exceed the respective sums of the first intensity values of the pixels in the given region of the first virtual image and the multiple of said amount, performing any one of:

selectively skipping the step of increasing the minimum intensity level of those pixels in the given region of the first virtual image that present at least the part of the at least one virtual object;

increasing the minimum intensity level of those pixels in the given region of the first virtual image that present at least the part of the at least one virtual object by a given amount that is smaller than another amount by which the minimum intensity level of remaining pixels in the given region of the first virtual image is increased.

DETAILED DESCRIPTION OF THE DRAWINGS

FIG. 1 is a schematic illustration of a system 100 for augmenting reality using a multiscopic display having adaptive crosstalk compensation, in accordance with an embodiment of the present disclosure. The system 100 comprises tracking means 102, a light field display unit 104, an optical combiner 106, at least one real-world-facing camera, depicted as a real-world-facing camera 108, and at least one processor, depicted as a processor 110. The optical combiner 106 is arranged on an optical path of the light field display unit 104 and on an optical path of a real-world light field 112 of a real-world environment 114. The light field display unit 104 and the optical combiner 106 constitute the multiscopic display, which allows the real-world light field 112 to pass through towards a first eye 116a and a second eye 116b of at least one user.

The processor 110 is configured to:

determine a relative location of the first eye 116a and of the second eye 116b of the at least one user with respect to the optical combiner 106, by utilising the tracking means 102;

obtain a first virtual image and a second virtual image to be presented to the first eye 116a and the second eye 116b of the at least one user, respectively, based on the relative location of the first eye 116a and of the second eye 116b of the at least one user with respect to the optical combiner 106;

capture at least one real-world image of the real-world environment 114 via the real-world-facing camera 108;

for a given region of the first virtual image, determine intensity values of pixels in a corresponding portion of the at least one real-world image;

for the given region of the first virtual image, determine an amount of crosstalk due to at least the second virtual image;

increase a minimum intensity level of pixels in the given region of the first virtual image, based on the intensity values of the pixels in the corresponding portion of the at least one real-world image;

adjust first intensity values of the pixels in the given region of the first virtual image, based on the amount of crosstalk determined for the given region of the first virtual image;

generate a light field image by utilising the first virtual image and the second virtual image; and display the light field image via the light field display unit 104 for producing a synthetic light field 118, wherein the optical combiner 106 is employed to reflect a first part and a second part of the synthetic light field 118 towards the first eye 116a and the second eye 116b of the at least one user, presenting the first virtual image and the second virtual image to the first eye 116a and the second eye 116b, respectively, whilst optically combining the first part and the second part of the synthetic light field 118 with the real-world light field 112.

The real-world environment may have at least one real-world object, depicted as a real-world object 120 (shown as a tree, for illustration purposes only). The synthetic light field 118 presents at least one virtual object depicted as a virtual object 122 (shown as a star, for illustration purposes only).

For illustration purposes only, the virtual object 122 is shown to be presented at an optical depth that is much smaller than another optical depth at which the real-world object 120 is present. Optionally, in such a case, a defocus blur is applied on the at least one real-world image of the real-world environment 114, prior to determining the intensity values of the pixels in the corresponding portion of the at least one real-world image.

It may be understood by a person skilled in the art that FIG. 1 includes a simplified example implementation of the system 100, for sake of clarity, which should not unduly limit the scope of the claims herein. It is to be understood that a specific implementation of the system 100 is not to be construed as limiting it to specific numbers or types of tracking means, light field display units, optical combiners, real-world-facing cameras, and processors. A person skilled in the art will recognize many variations, alternatives, and modifications of embodiments of the present disclosure.

Figure 2:
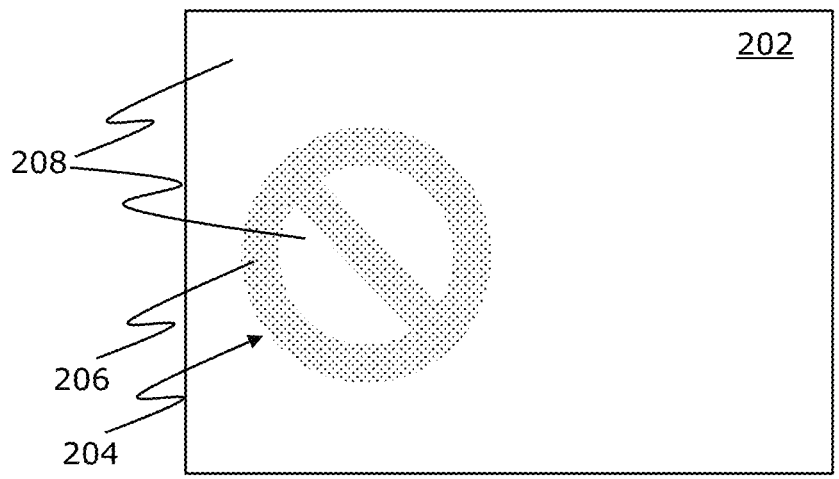
FIG. 2 illustrates how a relatively dark virtual object can be presented on a highly-bright real-world object (acting as a background), in accordance with an embodiment of the present disclosure.

FIG. 2 illustrates how a relatively dark virtual object can be presented on a highly-bright real-world object (acting as a background), in accordance with an embodiment of the present disclosure. Optionally, when it is detected that a given region 202 of a given virtual image presents at least a part of at least one virtual object (depicted as a virtual object 204), and intensity values of pixels in a corresponding portion of at least one real-world image exceed respective sums of intensity values of pixels in the given region 202 of the given virtual image and a multiple of an amount by which a minimum intensity level is to be increased, any one of the following is performed:

selectively skipping increasing the minimum intensity level of those pixels 206 in the given region 202 of the given virtual image that present at least the part of the virtual object 204;

increase the minimum intensity level of those pixels 206 in the given region 202 of the given virtual image that present at least the part of the virtual object 204 by a given amount that is smaller than another amount by which the minimum intensity level of remaining pixels 208 in the given region 202 of the given virtual image is increased.

As shown, those pixels 206 for which the step of increasing the minimum intensity level is skipped selectively (namely, the black level lift is not performed at all), or for which the minimum intensity level is increased by the given amount that is relatively smaller than the another amount (namely, the black level lift is attenuated and performed to a relatively smaller extent), would appear darker than the remaining pixels 208 in the given region 202. In this regard, the pixels 206 can be selected based on a shape and a size of at least the part of the virtual object 204 they present. The virtual object 204 is shown as a stop symbol, for illustration purposes only.

Otherwise, when it is detected that the intensity values of the pixels in the corresponding portion of the at least one real-world image do not exceed the respective sums of the intensity values of the pixels in the given region 202 of the given virtual image and the multiple of said amount, the minimum intensity level of the pixels in the given region 202 of the given virtual image may be increased uniformly in the given region of the given virtual image.

FIG. 2 is merely an example, which should not unduly limit the scope of the claims herein. A person skilled in the art will recognize many variations, alternatives, and modifications of embodiments of the present disclosure.

Figure 3:
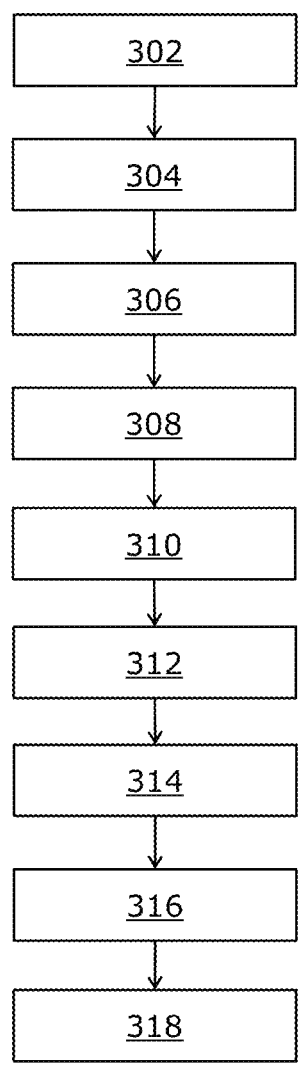
FIG. 3 illustrates steps of a method for augmenting reality using a multiscopic display having adaptive crosstalk compensation, in accordance with an embodiment of the present disclosure.

Referring to FIG. 3, illustrated are steps of a method for augmenting reality using a multiscopic display having adaptive crosstalk compensation, in accordance with an embodiment of the present disclosure. At step 302, a relative location of a first eye and of a second eye of at least one user with respect to an optical combiner is determined, by utilising tracking means, wherein the optical combiner is arranged on an optical path of a light field display unit and on an optical path of a real-world light field of a real-world environment. At step 304, a first virtual image and a second virtual image to be presented to the first eye and the second eye of the at least one user, respectively, is obtained based on the relative location of the first eye and of the second eye of the at least one user with respect to the optical combiner. At step 306, at least one real-world image of the real-world environment is captured via at least one real-world-facing camera. At step 308, for a given region of the first virtual image, intensity values of pixels in a corresponding portion of the at least one real-world image are determined. At step 310, for the given region of the first virtual image, an amount of crosstalk due to at least the second virtual image is determined. At step 312, a minimum intensity level of pixels in the given region of the first virtual image is increased, based on the intensity values of the pixels in the corresponding portion of the at least one real-world image. At step 314, first intensity values of the pixels in the given region of the first virtual image are adjusted, based on the amount of crosstalk determined for the given region of the first virtual image. At step 316, a light field image is generated by utilising the first virtual image and the second virtual image. At step 318, the light field image is displayed via the light field display unit for producing a synthetic light field, wherein the optical combiner is employed to reflect a first part and a second part of the synthetic light field towards the first eye and the second eye of the at least one user, presenting the first virtual image and the second virtual image to the first eye and the second eye, respectively, whilst optically combining the first part and the second part of the synthetic light field with the real-world light field.

The aforementioned steps are only illustrative and other alternatives can also be provided where one or more steps are added, one or more steps are removed, or one or more steps are provided in a different sequence without departing from the scope of the claims herein.

The invention claimed is:

1. A system comprising:
   tracking means;
   a light field display unit;
   an optical combiner arranged on an optical path of the light field display unit and on an optical path of a real-world light field of a real-world environment;
   at least one real-world-facing camera; and
   at least one processor configured to:
   determine a relative location of a first eye and of a second eye of at least one user with respect to the optical combiner, by utilising the tracking means;
   obtain a first virtual image and a second virtual image to be presented to the first eye and the second eye of the at least one user, respectively, based on the relative location of the first eye and of the second eye of the at least one user with respect to the optical combiner;
   capture at least one real-world image of the real-world environment via the at least one real-world-facing camera;
   for a given region of the first virtual image, determine intensity values of pixels in a corresponding portion of the at least one real-world image;
   for the given region of the first virtual image, determine an amount of crosstalk due to at least the second virtual image;
   increase a minimum intensity level of pixels in the given region of the first virtual image, based on the intensity values of the pixels in the corresponding portion of the at least one real-world image;
   adjust first intensity values of the pixels in the given region of the first virtual image, based on the amount of crosstalk determined for the given region of the first virtual image;
   generate a light field image by utilising the first virtual image and the second virtual image; and
   display the light field image via the light field display unit for producing a synthetic light field, wherein the optical combiner is employed to reflect a first part and a second part of the synthetic light field towards the first eye and the second eye of the at least one user, presenting the first virtual image and the second virtual image to the first eye and the second eye, respectively, whilst optically combining the first part and the second part of the synthetic light field with the real-world light field.

2. The system of claim 1, wherein the at least one processor is configured to:
   for a given region of the second virtual image, determine intensity values of pixels in a corresponding portion of the at least one real-world image;
   for the given region of the second virtual image, determine an amount of crosstalk due to at least the first virtual image;
   increase a minimum intensity level of pixels in the given region of the second virtual image, based on the intensity values of the pixels in the corresponding portion of the at least one real-world image; and
   adjust second intensity values of the pixels in the given region of the second virtual image, based on the amount of crosstalk determined for the given region of the second virtual image.

3. The system of claim 1, wherein the at least one processor is configured to:
   detect, for the given region of the first virtual image, when the intensity values of the pixels in the corresponding portion of the at least one real-world image exceed at least one of: a predefined threshold intensity value, respective ones of the first intensity values of the pixels in the given region of the first virtual image, respective sums of the first intensity values and a multiple of an amount by which the minimum intensity level is to be increased; and
   when it is detected, for the given region of the first virtual image, that the intensity values of the pixels in the corresponding portion of the at least one real-world image exceed at least one of: the predefined threshold intensity value, the respective ones of the first intensity values of the pixels in the given region of the first virtual image, the respective sums of the first intensity values and the multiple of said amount, perform at least one of:
   skip determining the amount of crosstalk for the given region of the first virtual image;
   skip increasing the minimum intensity level of the pixels in the given region of the first virtual image;
   reduce an amount by which the minimum intensity level is increased in at least one of: the given region of the first virtual image, a surrounding region of the given region in the first virtual image;
   skip adjusting the first intensity values of the pixels in the given region of the first virtual image, based on the amount of crosstalk determined for the given region of the first virtual image; or
   reduce the first intensity values of the pixels in the given region of the first virtual image.

4. The system of claim 1, wherein the at least one user comprises a plurality of users, wherein the at least one processor is configured to:
   detect when intensity values of pixels in a given region of a given virtual image for a given eye of a given user are higher than intensity values of pixels in a corresponding portion of the at least one real-world image, and when the intensity values of the pixels in the given region of the given virtual image are lower than intensity values of pixels in another portion of the at least one real-world image that corresponds to a region of another virtual image for a given eye of another user, wherein light corresponding to the given region of the given virtual image and light corresponding to said region of the another virtual image reflect off a same portion of the optical combiner towards the given eye of the given user and the given eye of the another user, respectively; and
   when it is detected that the intensity values of the pixels in the given region of the given virtual image for the given eye of the given user are higher than the intensity values of the pixels in the corresponding portion of the at least one real-world image, and when the intensity values of the pixels in the given region of the given virtual image are lower than the intensity values of the pixels in the another portion of the at least one real-world image that corresponds to said region of the another virtual image for the given eye of the another user, perform at least one of:

skip determining an amount of crosstalk for the given region of the given virtual image;
skip increasing a minimum intensity level of the pixels in the given region of the given virtual image;
reduce an amount by which the minimum intensity level is increased in at least one of: the given region of the given virtual image, a surrounding region of the given region in the given virtual image; or
skip adjusting the intensity values of the pixels in the given region of the given virtual image, based on the amount of crosstalk determined for the given region of the given virtual image.

5. The system of claim 1, wherein the first intensity values of the pixels in the given region of the first virtual image are adjusted separately for each sub-pixel.

6. The system of claim 1, further comprising gaze-tracking means, wherein the at least one processor is configured to:
determine gaze directions of the first eye and the second eye of the at least one user, by utilising the gaze-tracking means;
determine a focus depth at which the at least one user is gazing, based on the gaze directions of the first eye and the second eye;
detect when a difference between the focus depth and an optical depth at which at least one virtual object is being presented via the synthetic light field is greater than a predefined threshold difference; and
when it is detected that said difference is greater than the predefined threshold difference, perform at least one of:
skip determining the amount of crosstalk for the given region of the first virtual image;
skip or attenuate increasing the minimum intensity level of the pixels in the given region of the first virtual image; or
skip or attenuate adjusting the first intensity values of the pixels in the given region of the first virtual image, based on the amount of crosstalk determined for the given region of the first virtual image.

7. The system of claim 1, further comprising gaze-tracking means, wherein the at least one processor is configured to:
determine a gaze direction of the first eye of the at least one user, by utilising the gaze-tracking means;
detect, based on the gaze direction of the first eye, when the at least one user is not gazing at the given region of the first virtual image; and
when it is detected that the at least one user is not gazing at the given region of the first virtual image, perform at least one of:
skip determining the amount of crosstalk for the given region of the first virtual image;
skip or attenuate increasing the minimum intensity level of the pixels in the given region of the first virtual image; or
skip or attenuate adjusting the first intensity values of the pixels in the given region of the first virtual image, based on the amount of crosstalk determined for the given region of the first virtual image.

8. The system of claim 1, further comprising gaze-tracking means and at least one real-world-facing depth camera, wherein the at least one processor is configured to:
determine gaze directions of the first eye and the second eye of the at least one user, by utilising the gaze-tracking means;
determine a focus depth at which the at least one user is gazing, based on the gaze directions of the first eye and the second eye;
capture a depth image of the real-world environment, by utilising the at least one real-world-facing depth camera;
determine an optical depth at which a real-world object is present, based on the depth image and the gaze directions of the first eye and the second eye;
detect when a first difference between the focus depth and an optical depth at which at least one virtual object is being presented via the synthetic light field is smaller than a first predefined threshold difference, and detect when a second difference between the focus depth and the optical depth at which the real-world object is present is greater than a second predefined threshold difference; and
when it is detected that the first difference is smaller than the first predefined threshold difference and the second difference is greater than the second predefined threshold difference, apply a defocus blur on the at least one real-world image of the real-world environment, prior to determining the intensity values of the pixels in the corresponding portion of the at least one real-world image.

9. The system of claim 1, wherein when increasing the minimum intensity level of the pixels in the given region of the first virtual image, the at least one processor is configured to:
detect when the given region of the first virtual image presents at least a part of at least one virtual object, and when the intensity values of the pixels in the corresponding portion of the at least one real-world image exceed respective sums of the first intensity values of the pixels in the given region of the first virtual image and a multiple of an amount by which the minimum intensity level is to be increased; and
when it is detected that the given region of the first virtual image presents at least a part of at least one virtual object, and the intensity values of the pixels in the corresponding portion of the at least one real-world image exceed the respective sums of the first intensity values of the pixels in the given region of the first virtual image and the multiple of said amount, perform any one of:
selectively skip increasing the minimum intensity level of those pixels in the given region of the first virtual image that present at least the part of the at least one virtual object; or
increase the minimum intensity level of those pixels in the given region of the first virtual image that present at least the part of the at least one virtual object by a given amount that is smaller than another amount by which the minimum intensity level of remaining pixels in the given region of the first virtual image is increased.

10. A method comprising:
determining a relative location of a first eye and of a second eye of at least one user with respect to an optical combiner, by utilising tracking means, wherein the optical combiner is arranged on an optical path of a light field display unit and on an optical path of a real-world light field of a real-world environment;
obtaining a first virtual image and a second virtual image to be presented to the first eye and the second eye of the at least one user, respectively, based on the relative location of the first eye and of the second eye of the at least one user with respect to the optical combiner;

capturing at least one real-world image of the real-world environment via at least one real-world-facing camera;

for a given region of the first virtual image, determining intensity values of pixels in a corresponding portion of the at least one real-world image;

for the given region of the first virtual image, determining an amount of crosstalk due to at least the second virtual image;

increasing a minimum intensity level of pixels in the given region of the first virtual image, based on the intensity values of the pixels in the corresponding portion of the at least one real-world image;

adjusting first intensity values of the pixels in the given region of the first virtual image, based on the amount of crosstalk determined for the given region of the first virtual image;

generating a light field image by utilising the first virtual image and the second virtual image; and displaying the light field image via the light field display unit for producing a synthetic light field, wherein the optical combiner is employed to reflect a first part and a second part of the synthetic light field towards the first eye and the second eye of the at least one user, presenting the first virtual image and the second virtual image to the first eye and the second eye, respectively, whilst optically combining the first part and the second part of the synthetic light field with the real-world light field.

11. The method of claim 10, further comprising:
for a given region of the second virtual image, determining intensity values of pixels in a corresponding portion of the at least one real-world image;
for the given region of the second virtual image, determining an amount of crosstalk due to at least the first virtual image;
increasing a minimum intensity level of pixels in the given region of the second virtual image, based on the intensity values of the pixels in the corresponding portion of the at least one real-world image; and
adjusting second intensity values of the pixels in the given region of the second virtual image, based on the amount of crosstalk determined for the given region of the second virtual image.

12. The method of claim 10, further comprising:
detecting, for the given region of the first virtual image, when the intensity values of the pixels in the corresponding portion of the at least one real-world image exceed at least one of: a predefined threshold intensity value, respective ones of the first intensity values of the pixels in the given region of the first virtual image, respective sums of the first intensity values and a multiple of an amount by which the minimum intensity level is to be increased; and
when it is detected, for the given region of the first virtual image, that the intensity values of the pixels in the corresponding portion of the at least one real-world image exceed at least one of: the predefined threshold intensity value, the respective ones of the first intensity values of the pixels in the given region of the first virtual image, the respective sums of the first intensity values and the multiple of said amount, performing at least one of:
skipping the step of determining the amount of crosstalk for the given region of the first virtual image;
skipping the step of increasing the minimum intensity level of the pixels in the given region of the first virtual image;
reducing an amount by which the minimum intensity level is increased in at least one of: the given region of the first virtual image, a surrounding region of the given region in the first virtual image;
skipping the step of adjusting the first intensity values of the pixels in the given region of the first virtual image, based on the amount of crosstalk determined for the given region of the first virtual image; or
reducing the first intensity values of the pixels in the given region of the first virtual image.

13. The method of claim 10, wherein the at least one user comprises a plurality of users, wherein the method further comprises:
detecting when intensity values of pixels in a given region of a given virtual image for a given eye of a given user are higher than intensity values of pixels in a corresponding portion of the at least one real-world image, and when the intensity values of the pixels in the given region of the given virtual image are lower than intensity values of pixels in another portion of the at least one real-world image that corresponds to a region of another virtual image for a given eye of another user, wherein light corresponding to the given region of the given virtual image and light corresponding to said region of the another virtual image reflect off a same portion of the optical combiner towards the given eye of the given user and the given eye of the another user, respectively; and
when it is detected that the intensity values of the pixels in the given region of the given virtual image for the given eye of the given user are higher than the intensity values of the pixels in the corresponding portion of the at least one real-world image, and when the intensity values of the pixels in the given region of the given virtual image are lower than the intensity values of the pixels in the another portion of the at least one real-world image that corresponds to said region of the another virtual image for the given eye of the another user, performing at least one of:
skipping the step of determining an amount of crosstalk for the given region of the given virtual image;
skipping the step of increasing a minimum intensity level of the pixels in the given region of the given virtual image;
reducing an amount by which the minimum intensity level is increased in at least one of: the given region of the given virtual image, a surrounding region of the given region in the given virtual image; or
skipping the step of adjusting the intensity values of the pixels in the given region of the given virtual image, based on the amount of crosstalk determined for the given region of the given virtual image.

14. The method of claim 10, wherein the first intensity values of the pixels in the given region of the first virtual image are adjusted separately for each sub-pixel.

15. The method of claim 10, further comprising:
determining gaze directions of the first eye and the second eye of the at least one user, by utilising gaze-tracking means;
determining a focus depth at which the at least one user is gazing, based on the gaze directions of the first eye and the second eye;
detecting when a difference between the focus depth and an optical depth at which at least one virtual object is being presented via the synthetic light field is greater than a predefined threshold difference; and when it is detected that said difference is greater than the predefined threshold difference, performing at least one of:
- skipping the step of determining the amount of crosstalk for the given region of the first virtual image;
- skipping or attenuating the step of increasing the minimum intensity level of the pixels in the given region of the first virtual image; or
- skipping or attenuating the step of adjusting the first intensity values of the pixels in the given region of the first virtual image, based on the amount of crosstalk determined for the given region of the first virtual image.

16. The method of claim 10, further comprising:

determining a gaze direction of the first eye of the at least one user, by utilising gaze-tracking means;

detecting, based on the gaze direction of the first eye, when the at least one user is not gazing at the given region of the first virtual image; and when it is detected that the at least one user is not gazing at the given region of the first virtual image, performing at least one of:
- skipping the step of determining the amount of crosstalk for the given region of the first virtual image;
- skipping or attenuating the step of increasing the minimum intensity level of the pixels in the given region of the first virtual image; or
- skipping or attenuating the step of adjusting the first intensity values of the pixels in the given region of the first virtual image, based on the amount of crosstalk determined for the given region of the first virtual image.

17. The method of claim 10, further comprising:

determining gaze directions of the first eye and the second eye of the at least one user, by utilising gaze-tracking means;

determining a focus depth at which the at least one user is gazing, based on the gaze directions of the first eye and the second eye;

capturing a depth image of the real-world environment, by utilising at least one real-world-facing depth camera;

determining an optical depth at which a real-world object is present, based on the depth image and the gaze directions of the first eye and the second eye;

detecting when a first difference between the focus depth and an optical depth at which at least one virtual object is being presented via the synthetic light field is smaller than a first predefined threshold difference, and when a second difference between the focus depth and the optical depth at which the real-world object is present is greater than a second predefined threshold difference; and when it is detected that the first difference is smaller than the first predefined threshold difference and the second difference is greater than the second predefined threshold difference, applying a defocus blur on the at least one real-world image of the real-world environment, prior to determining the intensity values of the pixels in the corresponding portion of the at least one real-world image.

18. The method of claim 10, wherein the step of increasing the minimum intensity level of the pixels in the given region of the first virtual image comprises:

detecting when the given region of the first virtual image presents at least a part of at least one virtual object, and when the intensity values of the pixels in the corresponding portion of the at least one real-world image exceed respective sums of the first intensity values of the pixels in the given region of the first virtual image and a multiple of an amount by which the minimum intensity level is to be increased; and when it is detected that the given region of the first virtual image presents at least a part of at least one virtual object, and the intensity values of the pixels in the corresponding portion of the at least one real-world image exceed the respective sums of the first intensity values of the pixels in the given region of the first virtual image and the multiple of said amount, performing any one of:
- selectively skipping the step of increasing the minimum intensity level of those pixels in the given region of the first virtual image that present at least the part of the at least one virtual object; or
- increasing the minimum intensity level of those pixels in the given region of the first virtual image that present at least the part of the at least one virtual object by a given amount that is smaller than another amount by which the minimum intensity level of remaining pixels in the given region of the first virtual image is increased.

* * * * *